US012767888B2

(12) United States Patent
Xie et al.

(10) Patent No.: US 12,767,888 B2
(45) Date of Patent: Oct. 20, 2026

(54) PREPARATION METHOD FOR DEGRADABLE LIQUID-STATE MULCHING FILM BY USING LIVESTOCK MANURE AS RAW MATERIAL

(71) Applicant: Nanchang University, Nanchang (CN)

(72) Inventors: Xianchuan Xie, Nanchang (CN); Xiaohao Guo, Nanchang (CN)

(73) Assignee: Nanchang University, Nanchang (CN)

(*) Notice: Subject to any disclaimer, the term of this patent is extended or adjusted under 35 U.S.C. 154(b) by 224 days.

(21) Appl. No.: 18/781,898

(22) Filed: Jul. 23, 2024

(65) Prior Publication Data

US 2025/0084313 A1 Mar. 13, 2025

(30) Foreign Application Priority Data

Sep. 11, 2023 (CN) ......................... 202311167781.9

(51) Int. Cl.

| | |
|---|---|
| ***C09K 17/52*** | (2006.01) |
| ***A01G 13/33*** | (2025.01) |
| ***C05F 3/00*** | (2006.01) |
| ***C05G 3/50*** | (2020.01) |
| ***C05G 3/80*** | (2020.01) |
| ***C05G 5/16*** | (2020.01) |
| ***C05G 5/40*** | (2020.01) |
| *A01G 13/00* | (2006.01) |

(52) U.S. Cl.

CPC .............. *C09K 17/52* (2013.01); *A01G 13/33* (2025.01); *C05F 3/00* (2013.01); *C05G 3/50* (2020.02); *C05G 3/80* (2020.02); *C05G 5/16* (2020.02); *C05G 5/40* (2020.02); *A01G 2013/004* (2013.01)

(58) Field of Classification Search

CPC ............... C05F 3/00; C05G 5/20; C05G 5/10; C05G 5/16; A01C 3/00; A01G 2013/004; A01G 13/33; A01G 13/35

See application file for complete search history.

(56) References Cited

FOREIGN PATENT DOCUMENTS

CN 106866307 A * 6/2017 ............. A01G 13/35

* cited by examiner

*Primary Examiner* — Tracy Liu

(57) ABSTRACT

The present disclosure specifically relates to a preparation method for a degradable liquid-state mulching film by using livestock manure as a raw material, including pulverizing and sieving the dried livestock manure, followed by mixing with water to form a slurry; mixing the slurry with a stabilizer, an inorganic material and water to form a homogeneous suspension, followed by mixing with a surfactant, a grafted monomer mixture, a plasticizer and water to form a pre-emulsified mixed liquid; and finally raising a temperature of the pre-emulsified mixed liquid and adding an initiator under stirring to react to obtain a liquid-state mulching film. The mulching film obtained in the present disclosure not only has the functions of temperature raising, soil moisture conservation and grass controlling, but also has a strong adhesion ability to cause top soil particles to form an ideal agglomerate structure.

9 Claims, 11 Drawing Sheets

PREPARATION METHOD FOR DEGRADABLE LIQUID-STATE MULCHING FILM BY USING LIVESTOCK MANURE AS RAW MATERIAL

CROSS-REFERENCE TO RELATED APPLICATIONS

This application claims priority of Chinese Patent Application No. 202311167781.9, filed on Sep. 11, 2023, the entire contents of which are incorporated herein by reference.

TECHNICAL FIELD

The present disclosure belongs to the technical field of liquid-state mulching films, and particularly relates to a preparation method for a degradable liquid-state mulching film by using livestock manure as a raw material.

BACKGROUND

In recent years, rapid socio-economic growth and increased demand for livestock and poultry markets have significantly advanced the development of livestock and poultry farming. Livestock and poultry breeding is changing from traditional free-range breeding to specialized breeding, leading to a sharp increase in poultry excrement emissions, having a great impact on the ecological environment and resource utilization, posing a serious threat to agricultural non-point source pollution, and even leading to the occurrence of epidemics, which are harmful to human health. Meanwhile, livestock manure is also a valuable resource, if not used, it will cause huge waste of resources. Therefore, it is urgent to develop new products that can effectively utilize livestock manure.

Mulching film covering technology, called "white revolution", plays an important role in the development of world agricultural production, and has made great contributions in breeding, seedling raising, crop cultivation, grain yield increasing, weeding, insect control and so on. At present, the plastic mulching film made of polyethylene or polyvinyl chloride is commonly used. The polyethylene material is non-degradable in the natural environment. Improper treatment will cause soil hardening, salinization, fertility decline and other problems. The longer the residual time, a large number of toxic substances will be released, which will further lead to water pollution and soil degradation, seriously endanger the ecological environment and human health, and cause serious plastic pollution. Therefore, the development of green degradable mulching film is significant.

The liquid-state mulching film is a film-forming substance in a liquid state, and the film liquid is coated on the soil surface by spraying. The film liquid can connect the soil surface particles in series with each other and form a layer of "soil film" structure after air-drying, and has the functions of heat preservation and moisture retention. Because of the advantages of degradability, low cost and convenient application, the liquid-state mulching film has become a hot research direction of domestic and foreign scholars to solve the problem of "white pollution" of plastic mulching film. A liquid-state mulching film containing livestock manure as a main material is disclosed in the patent with a publication number of CN1068866307A, which is composed of master material and sub-material. The master material mainly includes fresh excrement; and the sub-material includes polyvinyl alcohol, polyacrylic acid or salt, a water-retaining agent and soluble sodium silicate. The preparation method includes the steps of: deodorizing and sterilizing fresh livestock manure, adding humic acid raw powder and micro element fertilizer, grinding a mixture into a paste colloid master material, mixing vinyl alcohol, polyacrylic acid or salt, a water-retaining agent and water-soluble sodium silicate to form a sub-material having functions of film formation, permeation, dispersion, chelation, cross-linking, associating, adsorption and water-retaining, and dissolving the sub-material into the master material with water for mixing. In the patent, the livestock manure is used as a master material, but 10-20% of humic acid powder is also added into the master material, and the sub-material is mainly a film-forming assistant, and a liquid-state mulching film is obtained by directly mixing the master material and the sub-material. It can be seen that the film-forming property of the patent is completely dependent on the film-forming assistant, and it is not completely using livestock manure as a raw material, and the degradation performance cannot be guaranteed. To date, there have been no studies on the use of livestock manure in the preparation of polymeric liquid mulch.

SUMMARY

In view of the deficiencies of the prior art, the present disclosure provides a preparation method for a degradable liquid-state mulching film by using livestock manure as a raw material. The degradable liquid-state mulching film is obtained by only using livestock manure as a raw material, adding a small amount of auxiliary agents, mixing step by step and reacting. The degradable liquid-state mulching film is simple in preparation, readily available in raw materials, low in cost and excellent in performance, having good economic and ecological benefits.

An aspect of the present disclosure provides a preparation method for a degradable liquid-state mulching film by using livestock manure as a raw material, including the steps of:

(1) pulverizing dried livestock manure with a pulverizer, followed by sieving with a sieve to obtain livestock manure powder;

(2) stirring the livestock manure powder obtained in step (1) with water at 10-90° C. and a stirring rate of 100-3000 r/min for 1-10 h to obtain a livestock manure slurry;

(3) mixing the livestock manure slurry obtained in step (2) with a stabilizer, an inorganic material and water, and stirring a mixture at 10-90° C. and a stirring rate of 100-3000 r/min for 0.1-10 h to obtain a homogeneous suspension of livestock manure;

(4) mixing the suspension of livestock manure obtained in step (3) with a surfactant, a grafted monomer mixture, a plasticizer and water, and stirring a mixture at 10-90° C. and a stirring rate of 100-3000 r/min for 0.1-10 h to obtain a pre-emulsified mixed liquid of livestock manure; and (5) raising a temperature of the pre-emulsified mixed liquid of livestock manure obtained in step (4) to 30-90° C., adding an aqueous solution of an initiator at a stirring rate of 100-3000 r/min, allowing a mixture to react for 0.1-10 h at a constant temperature and stirring rate, cooling a reaction system to room temperature, and adjusting a pH of the system to 5.0-10.0 with aqueous ammonia to obtain a liquid-state mulching film liquid.

Natural polymers in livestock manure have been enzymolyzed in vivo, and have more grafted sites and high reactivity, so it is not necessary to modify the raw materials. In the present disclosure, the livestock manure is used as a raw material, the degradable liquid-state mulching film prepared by using the grafting advantages of natural macromolecular substances therein has the functions of temperature raising, soil moisture conservation and grass controlling, and has a strong adhesion ability, which can not only improve an added value of livestock manure, open up a channel for the utilization of livestock and poultry breeding waste, promote the sustainable development of livestock and poultry breeding economy, but also improve the soil fertility.

Preferably, in step (1) of the above technical solution, the livestock manure powder has a particle size of 50-300 mesh.

Preferably, in step (2) of the above technical solution, a mass ratio of the livestock manure to the water is 0.1-0.9:1.

Preferably, in step (3) of the above technical solution, a mass ratio of the livestock manure slurry, the stabilizer, the inorganic material and the water is 1-10:0.01-0.1:0.01-0.1:1.

Preferably, in step (4) of the above technical solution, a mass ratio of the suspension of livestock manure, the surfactant, the grafted monomer mixture, the plasticizer and the water is 1-10:0.001-0.1:0.1-1.5:0.001-0.1:1.

Preferably, in step (5) of the above technical solution, a mass ratio of the pre-emulsified mixed liquid of livestock manure, the initiator and the water is 1-5:0.01-0.1:1; and a concentration of the aqueous ammonia is 5-35%.

Preferably, in the above technical solution, the livestock manure is any one or a combination of cow excrement, pig excrement, sheep excrement, horse excrement and chicken excrement; the stabilizer is any one or a combination of gelatin, Arabic gum, tamarind polysaccharide gum, xanthan gum, agar, sodium alginate, carrageenan and pectin; and the inorganic material is any one or a combination of attapulgite, bentonite, kaolin, silicon dioxide, montmorillonite, sepiolite, red soil, yellow soil, atlapulgite, refractory clay and ball clay.

Preferably, in the above technical solution, the surfactant is any one or a combination of sodium lauryl sulfate, sodium dodecyl benzene sulfonate, sodium stearate, sodium methyl fatty acid sulfate, octaphenyl polyoxyethyiene, lecithin, long-chain fatty alcohol-polyoxyethylene ether, alkylphenol ethoxylates, polyoxyethylene fatty acid, polyoxyethylene alkyl amine and polyoxyethylene alkyl alcohol acid chloride; and the plasticizer is any one or a combination of propylene glycol, glycerinum and dibutyl phthalate.

Preferably, in the above technical solution, the grafted monomer is any one or a combination of maleic acid, maleic anhydride, diethyl maleate, dibutyl maleate, diisopropyl maleate, low coupling maleate, p-phenylenediamine dimaleic acid, acrylic acid, butyl acrylate, acrylamide, methyl acrylate, methacrylic acid, methyl methacrylate, 2-hydroxyethyl methacrylate, vinyltrimethoxysilane, vinyltriethoxysilane and 3-methacryloyloxypropyl trimethoxysilane; and the initiator includes any one or a combination of trialkyl boron, cerium salts, persulfate and hydrogen peroxide.

Preferably, the water is deionized water.

Another aspect of the present disclosure provides a degradable liquid-state mulching film prepared by the above preparation method.

Compared with the prior art, the present disclosure has the following advantageous effects.

1. In the present disclosure, the degradable liquid-state mulching film is prepared by grafting natural macromolecular substances from livestock manure which is taken as a raw material because of large output, low additional value, and easy availability, to improve an additional value of livestock manure, opening up a channel for the utilization of livestock and poultry breeding wastes, reducing environmental pollution, bringing good environmental and economic benefits and promoting the sustainable development of livestock and poultry breeding economy.

2. The degradable liquid-state mulching film product by using livestock manure base as a raw material provided by the present disclosure not only has the functions of temperature raising, soil moisture conservation and grass controlling, but also has a strong adhesion ability, so that top soil particles can form an ideal agglomerate structure, has a strong wind erosion resistance, is easy to be degraded, and can improve fertility after entering soil, with considerable economic and ecological benefits.

DETAILED DESCRIPTION

Figure 1:
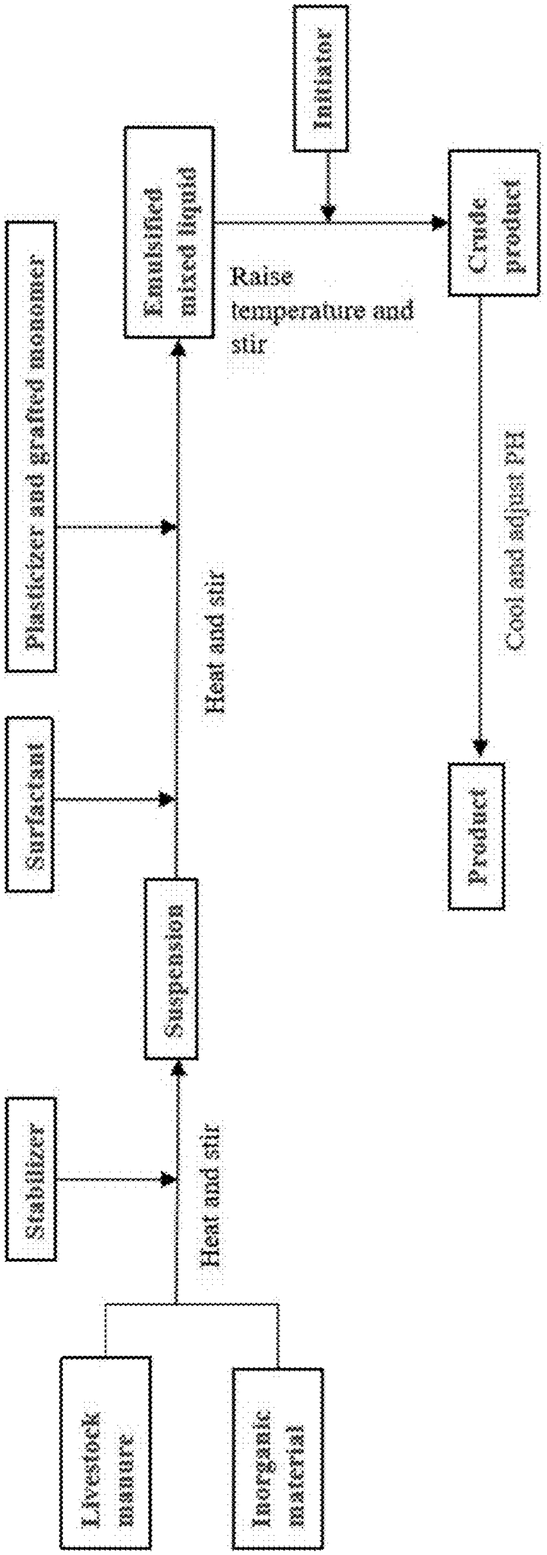
FIG. 1 is a process flow chart of preparing a degradable liquid-state mulching film by using livestock manure as a raw material.
Figure 2A:
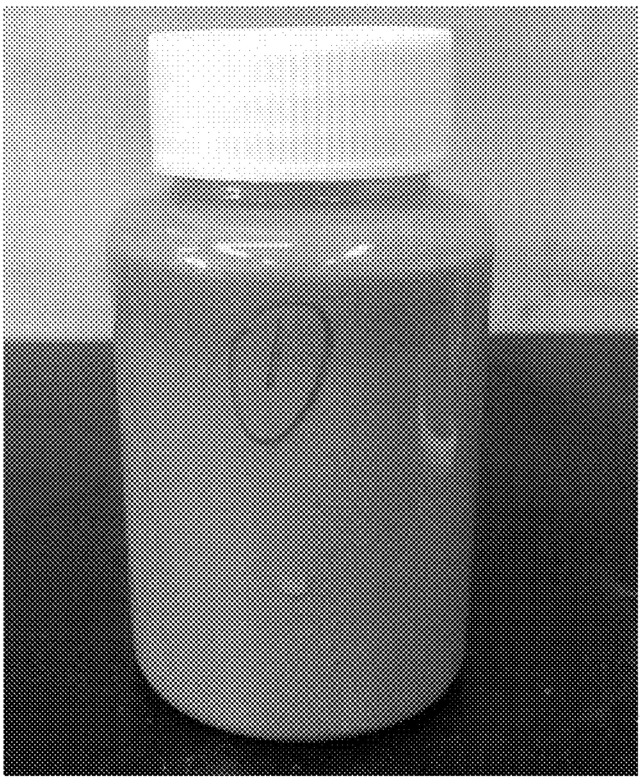
FIG. 2*a* is an appearance diagram of a liquid-state mulching film liquid of a degradable liquid-state mulching film prepared by using cow excrement as a raw material according to the present disclosure.
Figure 2B:
FIG. 2*b* is an appearance diagram of a film made of the liquid-state mulching film liquid of the degradable liquid-state mulching film prepared by using cow excrement as a raw material according to the present disclosure.
Figure 2C:
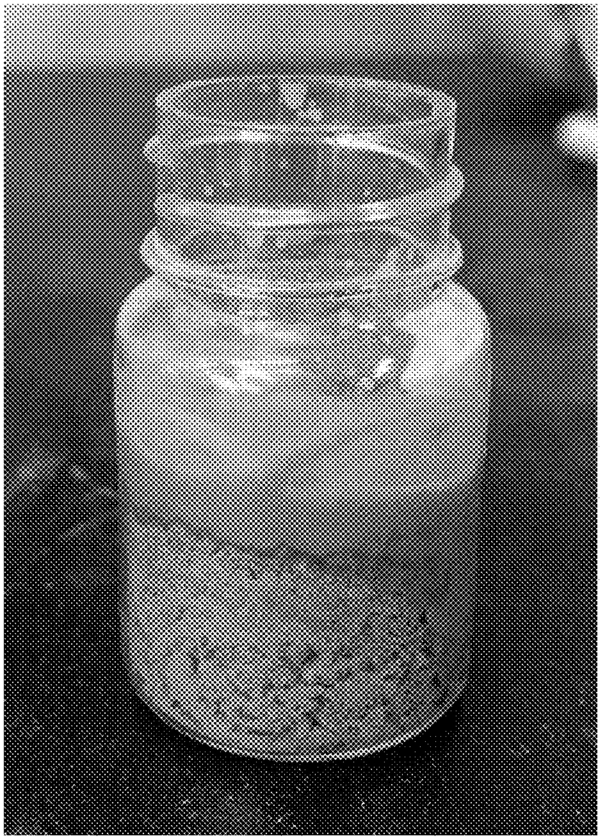
FIG. 2*c* is an appearance diagram of the liquid-state mulching film liquid of the degradable liquid-state mulching film prepared by using cow excrement as a raw material according to the present disclosure sprayed on soil surface (not easy to infiltrate)
Figure 2D:
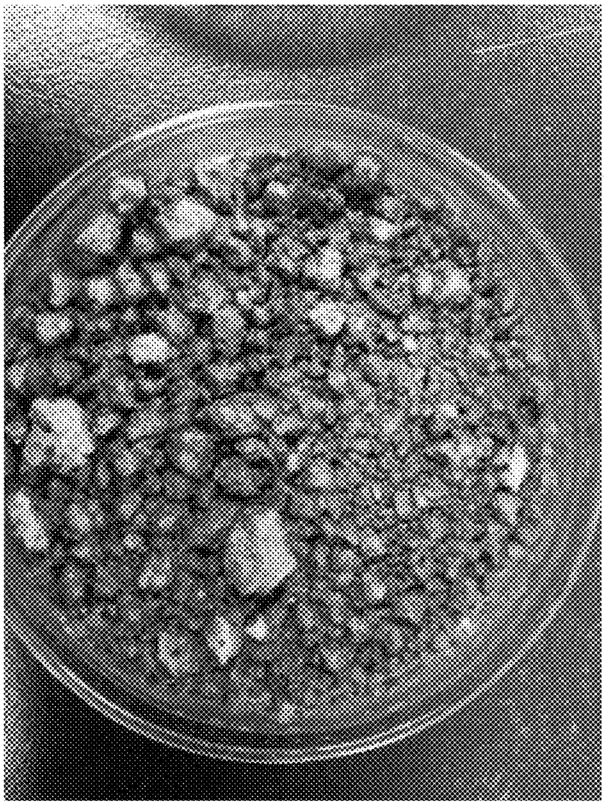
FIG. 2*d* is an appearance diagram of the film made of the liquid-state mulching film liquid of the degradable liquid-state mulching film prepared by using cow excrement as a raw material according to the present disclosure on the soil surface after air drying.
Figure 3A:
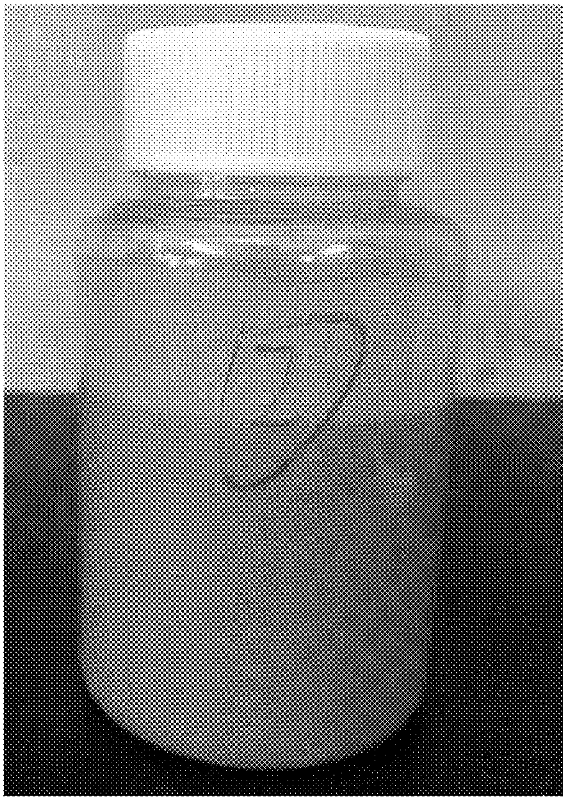
FIG. 3*a* is an appearance diagram of a liquid-state mulching film liquid of a degradable liquid-state mulching film prepared by using pig excrement as a raw material according to the present disclosure.
Figure 3B:
FIG. 3*b* is an appearance diagram of a film made of the liquid-state mulching film liquid of the degradable liquid-state mulching film prepared by using pig excrement as a raw material according to the present disclosure.
Figure 3C:
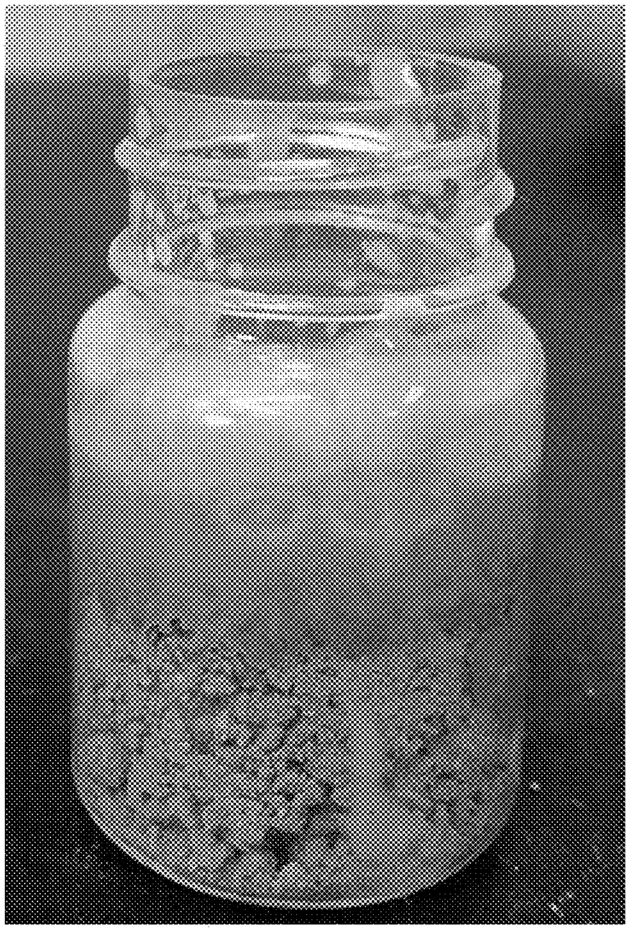
FIG. 3*c* is an appearance diagram of the liquid-state mulching film liquid of the degradable liquid-state mulching film prepared by using pig excrement as a raw material according to the present disclosure sprayed on soil surface (not easy to infiltrate)
Figure 3D:
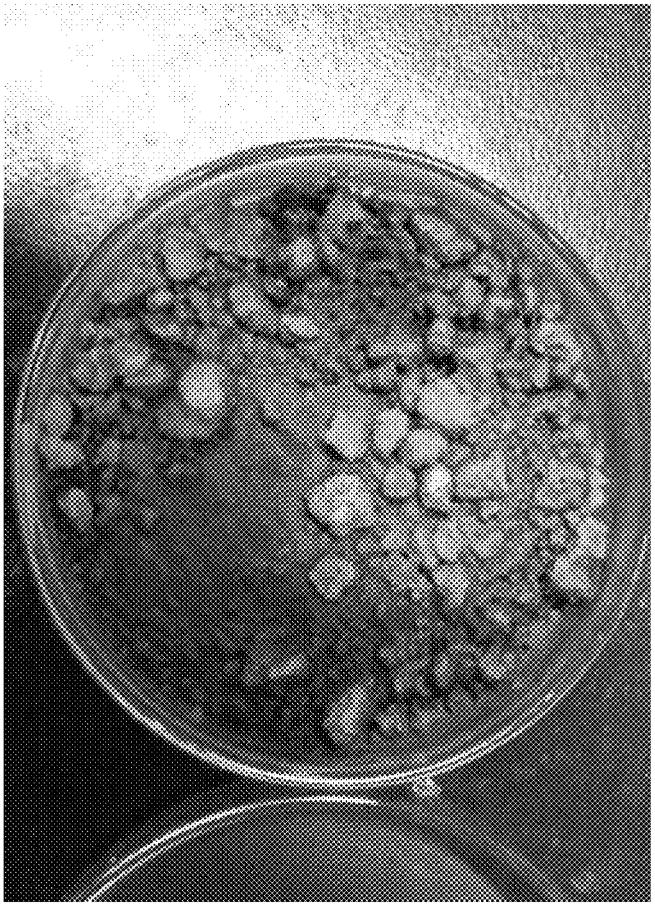
FIG. 3*d* is an appearance diagram of the film made of the liquid-state mulching film liquid of the degradable liquid-state mulching film prepared by using pig excrement as a raw material according to the present disclosure on the soil surface after air drying.
Figure 4A:
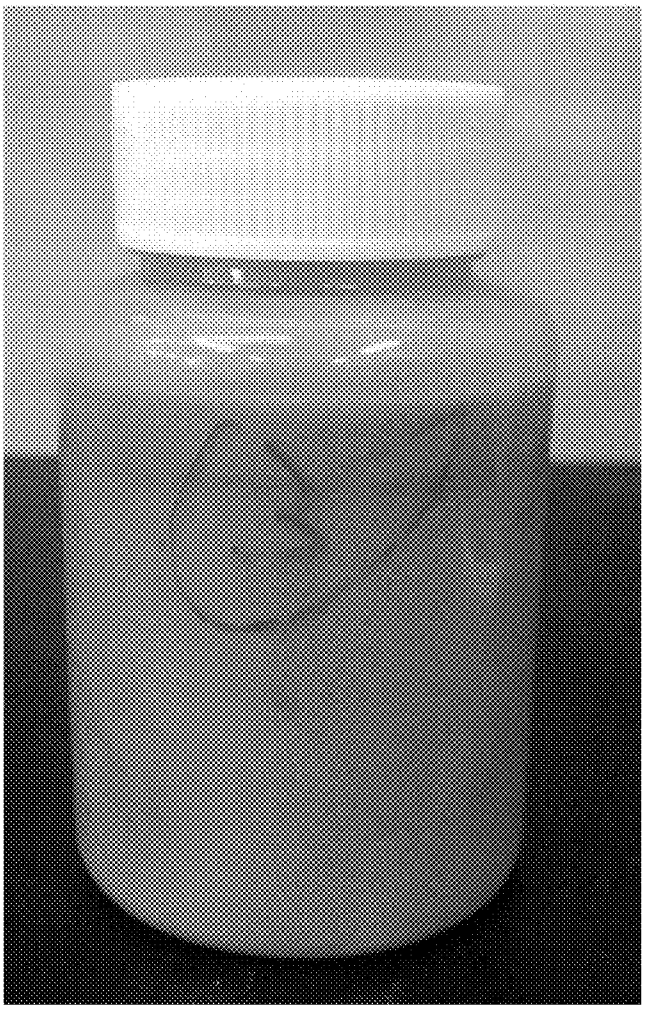
FIG. 4*a* is an appearance diagram of a liquid-state mulching film liquid of a degradable liquid-state mulching film prepared by using cow and pig excrement as a raw material according to the present disclosure.
Figure 4B:
FIG. 4*b* is an appearance diagram of a film made of the liquid-state mulching film liquid of the degradable liquid-state mulching film prepared by using cow and pig excrement as a raw material according to the present disclosure.
Figure 4C:
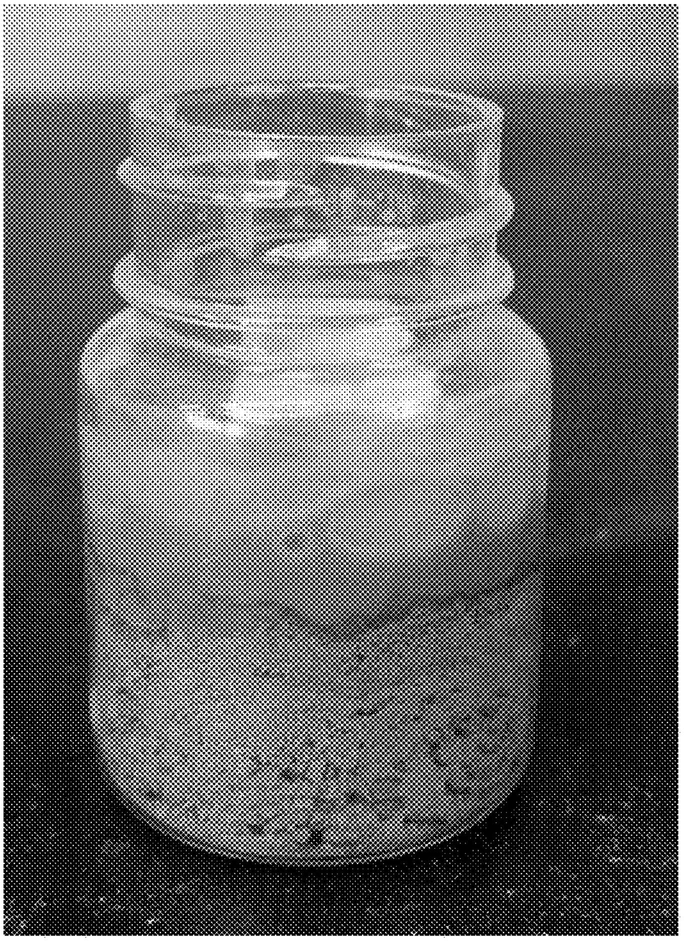
FIG. 4*c* is an appearance diagram of the liquid-state mulching film liquid of the degradable liquid-state mulching film prepared by using cow and pig excrement as a raw material according to the present disclosure sprayed on soil surface (not easy to infiltrate)
Figure 4D:
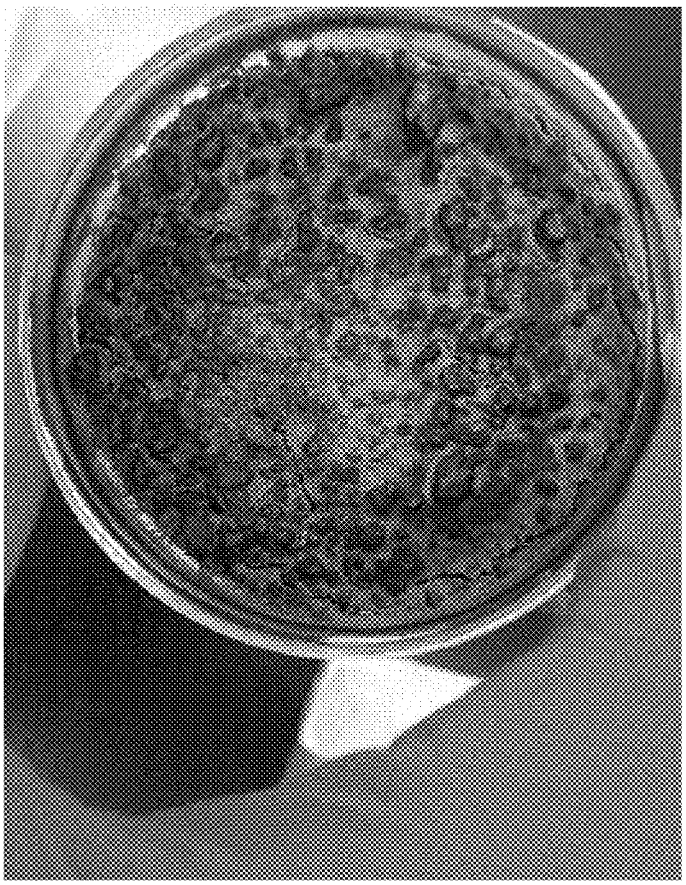
FIG. 4*d* is an appearance diagram of the film made of the liquid-state mulching film liquid of the degradable liquid-state mulching film prepared by using cow and pig excrement as a raw material according to the present disclosure on the soil surface after air drying.

Each of the above technical features of the present disclosure and each of the technical features specifically described below (e.g., examples) can be combined with each other to constitute a new or preferred technical solution. However, the present disclosure is not limited to only these examples, and likewise these examples do not limit the present disclosure in any way.

Experimental methods in the following examples, unless otherwise specified, are conventional methods. Formulations referred to in the following examples are generally commercially available, unless otherwise specified, and can be purchased on the market.

The present disclosure will be further described with reference to examples.

Example 1

A preparation method for a degradable liquid-state mulching film by using livestock manure as a raw material includes the following specific steps.

In (1), the dried cow excrement was pulverized into cow excrement powder with a pulverizer, and the obtained cow excrement was sieved with a sieve, making a particle size of the sieved cow excrement powder less than 100 mesh.

In (2), the cow excrement powder obtained in step (1) was mixed with water at 30° C. for 1 h at a stirring rate of 1000 r/min into a cow excrement slurry, a mass ratio of the cow excrement to the water being 0.5:1.

In (3), the cow excrement slurry obtained in step (2) was mixed with a stabilizer, an inorganic material and water, and a mixture was stirred at 30° C. for 1 h at a stirring rate of 1000 r/min to obtain a homogeneous suspension, a mass ratio of the cow excrement, the stabilizer, the inorganic material and the water being 1.52:0.03:0.05:1.

In (4), the homogeneous suspension obtained in step (3) was mixed with a surfactant, a grafted monomer mixture, a plasticizer and water, a mixture was stirred at 30° C. for 2 h at a stirring rate of 900 r/min to obtain a pre-emulsified mixed liquid, a mass ratio of the homogeneous suspension, the surfactant, the grafted monomer mixture, the plasticizer and the water being 8.16:0.002:0.8:0.012:1.

In (5), a temperature of the pre-emulsified mixed liquid obtained in step (4) was raised to 60° C., and an aqueous solution of an initiator was added at a stirring rate of 1000 r/min, a mass percentage concentration of the initiator being 0.2%; a mixture was allowed to react for 5 h at a constant temperature and stirring rate, a reaction system was cooled to room temperature, and a pH of the system was adjusted to 8.0 with aqueous ammonia at a mass percentage concentration of 30% to obtain a liquid-state mulching film liquid, a mass ratio of the pre-emulsified mixed liquid to the aqueous solution of the initiator being 2.05:1. An appearance diagram of the obtained liquid mulching film is as shown in FIG. 1.

Example 2

A preparation method for a degradable liquid-state mulching film by using livestock manure as a raw material includes the following specific steps.

In (1), the dried pig excrement was pulverized into pig excrement powder with a pulverizer, and the obtained pig excrement was sieved with a sieve, making a particle size of the sieved pig excrement powder less than 100 mesh.

In (2), the pig excrement granules obtained in step (1) was mixed with water at 30° C. for 1 h at a stirring rate of 1000 r/min into a pig excrement slurry, a mass ratio of the pig excrement to the water being 0.5:1.

In (3), the pig excrement slurry obtained in step (2) was mixed with a stabilizer, an inorganic material and water, and a mixture was stirred at 30° C. for 1 h at a stirring rate of 900 r/min to obtain a homogeneous suspension, a mass ratio of the cow excrement, the stabilizer, the inorganic material and the water being 1.52:0.04:0.06:1.

In (4), the homogeneous suspension obtained in step (3) was mixed with a surfactant, a grafted monomer mixture, a plasticizer and water, a mixture was stirred at 30° C. for 2 h at a stirring rate of 900 r/min to obtain a pre-emulsified mixed liquid, a mass ratio of the homogeneous suspension, the surfactant, the grafted monomer mixture, the plasticizer and the water being 8.22:0.002:1.2:0.01:1.

In (5), a temperature of the pre-emulsified mixed liquid obtained in step (4) was raised to 80° C., and an aqueous solution of an initiator was added at a stirring rate of 1000 r/min, a mass percentage concentration of the initiator being 0.4%; a mixture was allowed to react for 4 h at a constant temperature and stirring rate, a reaction system was cooled to room temperature, and a pH of the system was adjusted to 8.0 with aqueous ammonia at a mass percentage concentration of 30% to obtain a liquid-state mulching film liquid, a mass ratio of the pre-emulsified mixed liquid to the aqueous solution of the initiator being 2.6:1. An appearance diagram of the obtained liquid mulching film is as shown in FIG. 2.

Example 3

A preparation method for a degradable liquid-state mulching film by using livestock manure as a raw material includes the following specific steps.

In (1), the dried cow and pig excrement was pulverized into granules with a pulverizer, and the obtained cow and pig excrement was sieved with a sieve, making a particle size of the sieved cow and pig excrement granule less than 100 mesh.

In (2), the cow and pig excrement granules obtained in step (1) were mixed with water at 50° C. for 1 h at a stirring rate of 900 r/min into a cow and pig excrement slurry, a mass ratio of the cow excrement, the pig excrement and the water being 0.25:0.25:1.

In (3), the cow excrement slurry obtained in step (2) was mixed with a stabilizer, an inorganic material and water, and a mixture was stirred at 30° C. for 1 h at a stirring rate of 900 r/min to obtain a homogeneous suspension, a mass ratio of the slurry, the stabilizer, the inorganic material and the water being 1.6:0.04:0.05:1.

In (4), the homogeneous suspension obtained in step (3) was mixed with a surfactant, a grafted monomer mixture, a plasticizer and water, a mixture was stirred at 50° C. for 1 h at a stirring rate of 900 r/min to obtain a pre-emulsified mixed liquid, a mass ratio of the homogeneous suspension, the surfactant, the grafted monomer mixture, the plasticizer and the water being 8.16:0.003:1:0.011:1.

In (5), a temperature of the pre-emulsified mixed liquid obtained in step (4) was raised to 70° C., and an aqueous solution of an initiator was added at a stirring rate of 900 r/min, a mass percentage concentration of the initiator being 0.3%; a mixture was allowed to react for 4 h at a constant temperature and stirring rate, a reaction system was cooled to room temperature, and a pH of the system was adjusted to 8.0 with aqueous ammonia at a mass percentage concentration of 30%, a mass ratio of the pre-emulsified mixed liquid to the aqueous solution of the initiator being 2.25:1. An appearance diagram of the obtained liquid mulching film is as shown in FIG. 3.

Comparative Example 1

A preparation method for a degradable liquid-state mulching film by using livestock manure as a raw material was provided, which differed from Example 1 in that: in step (2), a mass ratio of cow excrement to water was 1.3:1; and the other preparation steps and reagent amounts were the same as in Example 1.

Comparative Example 2

A preparation method for a degradable liquid-state mulching film by using livestock manure as a raw material was provided, which differed from Example 1 in that: in step (3), an inorganic material was not added; and other reagent amounts were the same as in Example 1.

Experimental Example

The degradable liquid-state mulching films prepared in Examples 1-3 and Comparative Examples 1-2 of the present disclosure were subjected to the following performance tests.

1. Mechanical Properties Test

The mechanical properties of the prepared films were analyzed by a universal testing machine (Dongguan Dongri Instrument Co., Ltd, DR-508, China) according to GB/T 1040-2006 at a cross velocity of 5 mm/min. Each group had 3 samples, with a length of 50 mm, a width of 20 mm and a gauge length of 30 mm. Parallel tests were carried out to obtain average values of tensile strength and elongation at break. The results are shown in Table 1.

TABLE 1

Tensile strength and elongation at break

| Sample | Example 1 | Example 2 | Example 3 | Comparative Example 1 | Comparative Example 2 |
|---|---|---|---|---|---|
| Tensile strength/MPa | 20.5 | 21.4 | 19.8 | 5.7 | 7.9 |
| Elongation at break/% | 17.8 | 18.2 | 17.2 | 3.8 | 4.6 |

It can be seen from the data in Table 1 that the liquid-state mulching films in Examples 1-3 have good tensile strength and elongation at break, because the liquid-state mulching films prepared by the method of the present disclosure can form stable polymers by free radical graft polymerization of livestock manure and grafted monomers; however, the mechanical strength of the mulching film decreases when an amount of livestock manure is too large in Comparative Example 1, and the mechanical properties of the mulching film decrease significantly when the inorganic material is not added in Comparative Example 2, indicating that the addition of the inorganic material further promotes the cross-linking of polymer chains and greatly improves the mechanical properties of the film.

2. Soil Heat Preservation and Moisture Retention Tests

Testing of soil heat preservation performance: six flowerpots of 8 cm×8 cm×10 cm in size were selected and added with 900 g of soil, and the liquid-state mulching films prepared in Examples 1-3 and Comparative Examples 1-2 were uniformly sprayed on soil surfaces at an application amount of 0.8 kg/m$^2$. The sixth flowerpot without any mulching film was used as a blank control group, and the flowerpots were placed in an open-air environment. A temperature at a soil depth of 5 cm for each flowerpot was measured using a soil detector (Prsens, China) at 17:00-19:00 per day for 20 days, with average temperatures during this test period as reported values.

Testing of soil moisture retention performance: six flowerpots of 8 cm×8 cm×10 cm in size were selected and added with 900 g of soil, and the liquid-state mulching films prepared in Examples 1-3 and Comparative Examples 1-2 were uniformly sprayed on soil surfaces at an application amount of 0.8 kg/m$^2$. The sixth flowerpot without any mulching film was used as a blank control group, and the flowerpots were placed in an open-air environment. A cumulative weight loss of each flowerpot was measured after three days, and a soil moisture evaporation rate at a given time was calculated based on a ratio of a cumulative loss of soil weight to an initial soil weight. The results are shown in Table 2.

TABLE 2

Average soil temperature and soil moisture evaporation rate of flowerpot

| Sample | Example 1 | Example 2 | Example 3 | Comparative Example 1 | Comparative Example 2 | Blank control group |
|---|---|---|---|---|---|---|
| Average soil temperature | 27.6° C. | 28.3° C. | 27.3° C. | 25.7° C. | 25.9° C. | 24.8° C. |
| Soil moisture evaporation rate | 54% | 51% | 59% | 81% | 78% | 94% |

As can be seen from the data in Table 2 that a soil temperature of the flowerpots sprayed with the liquid-state mulching film liquids prepared in Examples 1-3 and Comparative Examples 1-2 is 0.9-3.5° C., higher than that of the flowerpot not sprayed with mulching film liquid; meanwhile, a moisture evaporation rate corresponding to the examples of the present disclosure is 40%, less than that in the comparative examples, indicating that the direct spraying of the degradable liquid-state mulching film prepared by the present disclosure on the soil surface can maintain the soil moisture and raise the soil temperature, which can significantly improve the soil moisture condition, moisture utilization rate and the soil fertility.

Finally, it is to be emphasized that the above is only the preferred example of the present disclosure, which is not used to limit the present disclosure. For those skilled in the art, the present disclosure can be subjected to various changes and modifications, and any modifications, equivalent substitutions, improvements, etc., made within the spirit and principle of the present disclosure are to be included in the scope of protection of the present disclosure.

The invention claimed is:

1. A preparation method for a degradable liquid-state mulching film by using livestock manure as a raw material, comprising the steps of:

(1) pulverizing dried livestock manure with a pulverizer, followed by sieving with a sieve to obtain livestock manure powder;

(2) stirring the livestock manure powder obtained in step (1) with water at 10-90° C. and a stirring rate of 100-3000 r/min for 1-10 h to obtain a livestock manure slurry;

(3) mixing the livestock manure slurry obtained in step (2) with a stabilizer, an inorganic material and water to obtain a first mixture, and stirring the first mixture at 10-90° C. and a stirring rate of 100-3000 r/min for 0.1-10 h to obtain a homogeneous suspension of livestock manure;

(4) mixing the suspension of livestock manure obtained in step (3) with a surfactant, a grafted monomer mixture, a plasticizer and water to obtain a second mixture, and stirring the second mixture at 10-90° C. and a stirring rate of 100-3000 r/min for 0.1-10 h to obtain a pre-emulsified mixed liquid of livestock manure; and (5) adding an aqueous solution of an initiator to the pre-emulsified mixed liquid of livestock manure obtained in step (4) at a temperature of 30-90° C. and a stirring rate of 100-3000 r/min to obtain a third mixture, allowing the third mixture to react for 0.1-10 h at a constant temperature and stirring rate to obtain a reacted product, cooling the reacted product to room temperature, and adjusting a pH of the reacted product to 5.0-10.0 with aqueous ammonia to obtain a liquid-state mulching film liquid.

2. The preparation method for a degradable liquid-state mulching film by using livestock manure as a raw material according to claim 1, wherein in step (1), the livestock manure powder has a particle size of 50-300 mesh.

3. The preparation method for a degradable liquid-state mulching film by using livestock manure as a raw material according to claim 1, wherein in step (2), a mass ratio of the livestock manure to the water is 0.1-0.9:1.

4. The preparation method for a degradable liquid-state mulching film by using livestock manure as a raw material according to claim 1, wherein in step (3), a mass ratio of the livestock manure slurry, the stabilizer, the inorganic material and the water is 1-10:0.01-0.1:0.01-0.1:1.

5. The preparation method for a degradable liquid-state mulching film by using livestock manure as a raw material according to claim 1, wherein in step (4), a mass ratio of the suspension of livestock manure, the surfactant, the grafted monomer mixture, the plasticizer and the water is 1-10:0.001-0.1:0.1-1.5:0.001-0.1:1.

6. The preparation method for a degradable liquid-state mulching film by using livestock manure as a raw material according to claim 1, wherein in step (5), a mass ratio of the pre-emulsified mixed liquid of livestock manure, the initiator and the water is 1-5:0.01-0.1:1; and a concentration of the aqueous ammonia is 5-35%.

7. The preparation method for a degradable liquid-state mulching film by using livestock manure as a raw material according to claim 1, wherein the livestock manure is any one or a combination of cow excrement, pig excrement, sheep excrement, horse excrement and chicken excrement; the stabilizer is any one or a combination of gelatin, Arabic gum, tamarind polysaccharide gum, xanthan gum, agar, sodium alginate, carrageenan and pectin; and the inorganic material is any one or a combination of attapulgite, bentonite, kaolin, silicon dioxide, montmorillonite, sepiolite, red soil, yellow soil, attapulgite, refractory clay and ball clay.

8. The preparation method for a degradable liquid-state mulching film by using livestock manure as a raw material according to claim 1, wherein the surfactant is any one or a combination of sodium lauryl sulfate, sodium dodecyl benzene sulfonate, sodium stearate, sodium methyl fatty acid sulfate, octaphenyl polyoxyethylene, lecithin, long-chain fatty alcohol-polyoxyethylene ether, alkylphenol ethoxylates, polyoxyethylene fatty acid, polyoxyethylene alkyl amine and polyoxyethylene alkyl alcohol acid chloride; and the plasticizer is any one or a combination of propylene glycol, glycerinum and dibutyl phthalate.

9. The preparation method for a degradable liquid-state mulching film by using livestock manure as a raw material according to claim 1, wherein the grafted monomer is any one or a combination of maleic acid, maleic anhydride, diethyl maleate, dibutyl maleate, diisopropyl maleate, coupling maleate, p-phenylenediamine dimaleic acid, acrylic acid, butyl acrylate, acrylamide, methyl acrylate, methacrylic acid, methyl methacrylate, 2-hydroxyethyl methacrylate, vinyltrimethoxysilane, vinyltriethoxysilane and 3-methacryloyloxypropyl trimethoxysilane; and the initiator comprises any one or a combination of trialkyl boron, cerium salts, persulfate and hydrogen peroxide.

* * * * *